United States Patent
Fischer

(10) Patent No.: US 7,980,169 B2
(45) Date of Patent: Jul. 19, 2011

(54) COFFEE MACHINE UTILIZING PRE-PACKED PRE-PORTIONED POUCHES

(75) Inventor: Daniel Fischer, Romanshorn (CH)

(73) Assignee: Eugster/Frismag AG, Romanshorn (CH)

( * ) Notice: Subject to any disclaimer, the term of this patent is extended or adjusted under 35 U.S.C. 154(b) by 915 days.

(21) Appl. No.: 11/708,373

(22) Filed: Feb. 16, 2007

(65) Prior Publication Data

US 2008/0006159 A1    Jan. 10, 2008

(30) Foreign Application Priority Data

Feb. 17, 2006 (DE) ............... 20 2006 002 678 U

(51) Int. Cl.
*A47J 31/00* (2006.01)

(52) U.S. Cl. ......... 99/289 R; 99/289 T; 99/279; 99/295; 99/302 R

(58) Field of Classification Search ............ 99/289 R, 99/289 T, 279, 295, 302 R
See application file for complete search history.

(56) References Cited

U.S. PATENT DOCUMENTS

| | | | | |
|---|---|---|---|---|
| 5,794,519 A * | 8/1998 | Fischer | ........................ | 99/295 |
| 6,079,315 A | 6/2000 | Beaulieu et al. | | |
| 6,345,570 B1 * | 2/2002 | Santi | ........................ | 99/289 R |
| 2003/0066431 A1 * | 4/2003 | Fanzutti et al. | ........................ | 99/279 |
| 2003/0071056 A1 | 4/2003 | Hale | | |

FOREIGN PATENT DOCUMENTS

| | | |
|---|---|---|
| DE | 4338629 C | 8/1994 |
| DE | 60004013 | 7/2003 |
| DE | 60021531 T | 7/2005 |
| EP | 0730425 B | 5/1999 |
| EP | 1152678 | 7/2003 |
| EP | 1050258 B | 8/2003 |
| EP | 1486150 A | 12/2004 |
| EP | 1417914 B | 12/2005 |
| EP | 1669011 | 6/2006 |
| WO | WO 9608990 | 3/1996 |

* cited by examiner

*Primary Examiner* — Mark H Paschall
*Assistant Examiner* — Brian Jennison
(74) *Attorney, Agent, or Firm* — DLA Piper LLP (US)

(57) ABSTRACT

A coffee machine for making a coffee beverage using pre-packed and pre-portioned coffee pouches including a brew chamber which includes a brew chamber top and a brew chamber base. The brew chamber top is movable by a locking mechanism along a virtual vertical axis from an elevated position to a position lowered on the brew chamber base to form a tight brew chamber and is movable back into the elevated position where a carrier of brew chamber base can be pushed, in horizontal plane from a pushed-in position in which the brew chamber base and the brew chamber top are disposed coaxially relative to each other, into a drawn-out position in which a pouch can be placed on said brew chamber base. Piercing elements are also supported at said brew chamber top and can be pushed into its interior. After elevating the brew chamber top and thus opening the brew chamber and drawing out the movable carrier, the piercing elements are withdrawn from the interior of the brew chamber top.

22 Claims, 5 Drawing Sheets

COFFEE MACHINE UTILIZING PRE-PACKED PRE-PORTIONED POUCHES

Figure 1:
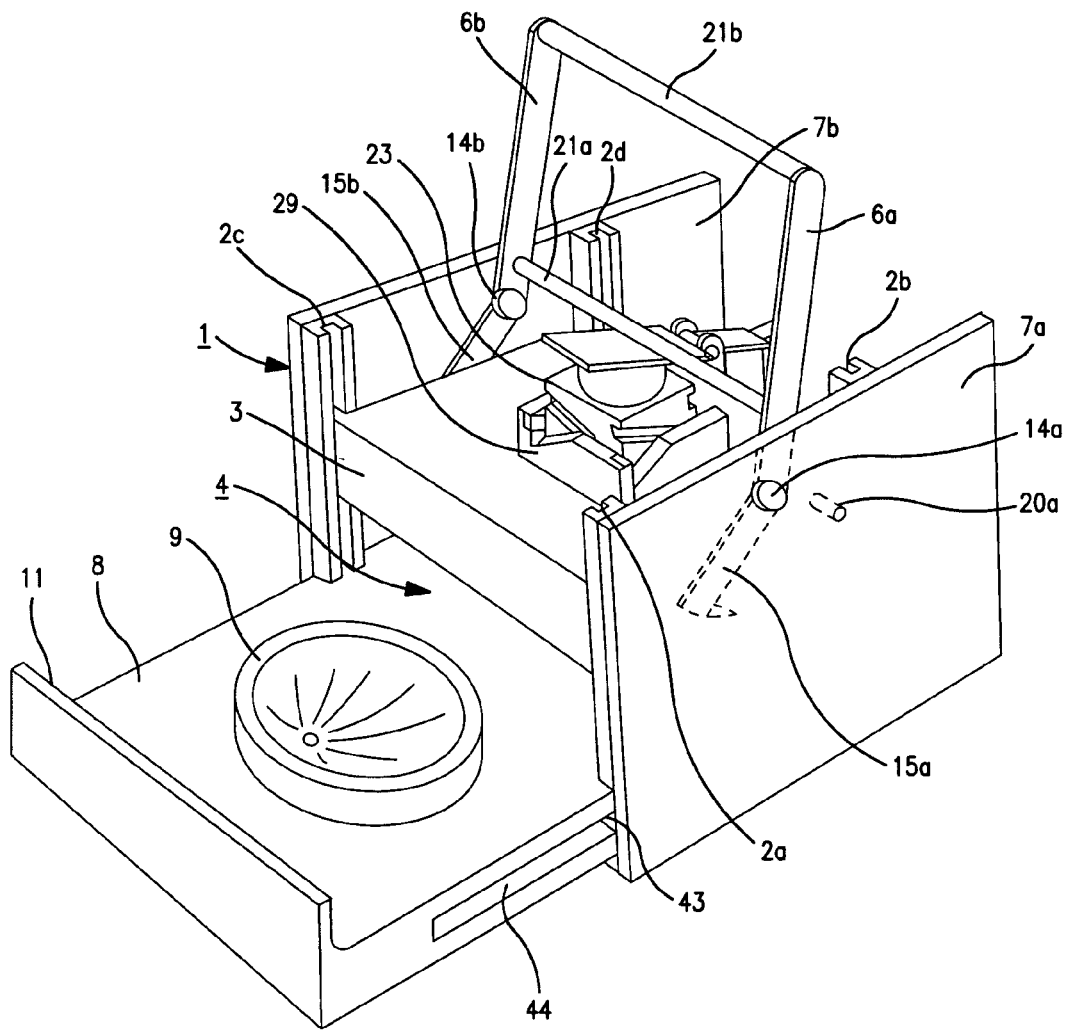

The present invention relates to a coffee machine for making a coffee beverage by means of pre-packed and pre-portioned coffee pouches.

AS a pre-packed, pre-portioned coffee pouch, a portion of ground coffee is to be understood which is provided in a flat, cushion-like envelope made of a material, particularly paper that can be penetrated by boiling water.

In accordance with the standard known from practice, coffee machines process such coffee pouches in such a way that the latter are placed into a take-up carrier which is subsequently moved into a brew unit comprising a brew chamber top and a brew chamber base. After charging the brew unit with the coffee pouch, the brew unit is tightly closed for the brewing process, after which brew water is fed, under pressure, into the brew unit causing the water to penetrate through the portion of pre-packed coffee whereby the coffee beverage is being brewed and a leached-out coffee pouch is left over. Disposal of the used coffee pouch is practiced after opening the brew unit, moving the take-up carrier out of the brew unit and removing the used coffee pouch, normally manually.

In order to simplify the awkward manual removal of the used coffee pouch from the brew unit and to extensively automate it, a coffee machine of the kind referred to in the beginning has already been known wherein the brew chamber base includes push-out means to automatically remove the used coffee pouch during the course of a retracting movement of the brew chamber base from the position of the brew chamber and in cooperation with such retracting movement (EP 1 152 678 B1). The brew chamber base comprises elastic means which, at least during the course of the retracting movement, keep the coffee pouch clear of the bottom of a seat of the brew chamber base in order to render removal of the used coffee pouches easier. A carrier of the brew chamber base designed in particular as a carriage may glide horizontally on a guide and be coupled to a motorized moving means or may be moved by hand. The carrier comprises, at its rearward part, a discharge opening through which the used coffee pouch may drop down when, cleared of the bottom of the seat in an elevated state when the carrier is retracted by the push out means, it is prevented from being taken along by the carrier, and thus glides to the discharge opening. In order to safeguard the elevated state of the used coffee pouch on the brew chamber base after the opening of the brew chamber, it might be suitable that also the brew chamber top cooperate with elastic means which, during the open state of the brew chamber, keep the used coffee pouch, at least partly, clear of the brew chamber top. In detail, the push-out means comprise hold-back means which can withhold the used coffee pouch while the carrier is moved from its inner position in which the brew chamber is being closed to the outer position when the brew chamber is opened. The hold-back means comprise a substantially vertical swivel rib disposed at right angles relative to the direction of movement of the carrier. The swivel rib is disposed at the front side next to the position of the brew chamber, or the brew chamber top, respectively, and can be removed from the movement path of the coffee pouch, i.e. swung away, to permit a fresh coffee pouch to pass while the carrier moves from its outer position, in which the coffee pouch can be placed onto the carrier, to the inner position of the carrier. To this end, the swivel rib can be actuated by means of cam means cooperating with longitudinal profiles on the carriage so that activation and deactivation of the swivel rib during the course of horizontal movement of the carrier can automatically take place. In the case of this coffee machine, it is of disadvantage that the push-out means, particularly the swivel rib next to the brew chamber, i.e. the brew chamber top, have to be disposed above the horizontal movement path of the carrier causing that the structure of the coffee machine becomes larger at this location. Moreover, the elastic means in the brew chamber top and, as the case may be, also in the brew chamber top will counteract a tight closure of the brew chamber by connecting the two portions thereof.

These disadvantages will not be avoided either by a variant on the above prior art coffee machine provided for capsules containing pre-packed portions of coffee. In the case of this variant, locking claws are mounted on the carrier cooperating with fixed abutments in order to clamp the capsule, in a first transition position, to the carrier and to release the capsules in a second transition position. Such locking claws for inherently stable capsules are not, by the way, suitable for clamping a coffee pouch.

It is therefore the aim of the present invention to provide a coffee machine for making a coffee beverage by means of pre-packed, pre-portioned coffee pouches, which avoids the disadvantages of the prior art coffee machines and which, in particular, makes possible a safe, tight closure of the brew chamber including the coffee pouch disposed in it prior to the brewing process and afterwards, and also after opening the brew chamber, a reliable automatic ejection of the used coffee pouch from the compactly designed coffee machine.

According to the solution of the invention, a coffee pouch used after the brewing of the coffee is reliably automatically removed from the coffee machine in that, first, the brew chamber top, as normally common for changing a coffee pouch, is moved into the position elevated from the brew chamber base so that the brew chamber is opened and piercing elements which are pressure-tightly disposed on the brew chamber top and which can be pushed into the interior of the brew chamber, or the brew chamber top, respectively, and thus into the coffee pouch, will take the used coffee pouch vertically along. Subsequently, the brew chamber base together with the horizontally movable carrier, can horizontally drawn out vertically and can arrive, without any obstruction by the used coffee pouch, from the area directly below the brew chamber top and a pouch opening in the carrier under the brew chamber top, upon which the piercing elements are automatically withdrawn from the interior of the brew chamber top into the drawn out position thereof releasing the used coffee pouch which glides through the pouch opening and, in the case given, a chassis opening underneath to leave the coffee machine.

Of significance in this connection are the movable piercing elements which can safely hold the coffee pouch, without substantially injuring the envelope of the coffee pouch, in an elevated position of the brew chamber top and release the coffee pouch in this position when instead of the brew chamber base the pouch opening in the carrier is under the brew chamber top.

Since the coffee machine need not include, in addition to the brew chamber in the area of the carrier, any stripping elements or push-out elements for a coffee pouch dropping onto the carrier, the coffee machine can be compact in its lateral extension.

According to the features of the present invention, the pouch opening in the horizontally movable carrier is so disposed that it is substantially centric below the brew chamber top when after opening the brew chamber the carrier is moved into its drawn-out position so that a fresh coffee pouch can be placed into the brew chamber base. The carrier can also be compact in its lateral extension since no push-out means or retaining means for the used-up pouch need be disposed above the carrier sidewise of the brew chamber position.

According to the features of the present invention, the piercing elements pressure-tightly supported in the brew chamber top to temporarily hold the coffee pouch are preferably inherently stable needles.

Instead of such needles, it is, however, also possible to provide as the piercing elements, elastic wires having wire ends that can be inserted into the interior of the brew chamber top, wherein the wires need only be stiff enough to enable them to be safely inserted through the envelope of the coffee pouch into the same. Both kinds of piercing elements have the advantage that they can reliably penetrate into the coffee pouch while not exerting large forces onto it and without injuring it substantially.

According to the features of the present invention, a plurality of piercing elements of a piercing element system are preferably staggered relative to each other in equal arc sections about a virtual central vertical axis concentrically extending relative to the brew chamber top. Thereby, it is achieved that the piercing elements when pushed into the interior of the brew chamber top in order to penetrate into the coffee pouch, will not exert any lateral forces which might displace the coffee pouch when the ends, or the tips, respectively, of the piercing elements penetrate into the coffee pouch.

The above-described effect of the arrangement staggered relative to each other of the piercing elements is extensively optimized if, as in accordance with claim 6, at least two piercing elements are disposed, preferably at equal angular distances, about the virtual central vertical axis of the piercing element system.

According to the features of the present invention, the needles provided as piercing elements are, moreover, suitably aligned tangentially at a virtual circle about the central virtual axis of the piercing element system. This results in a compact arrangement and reliable operation based on an operation mechanism disposed centrally about the vertical axis.

Preferably, the piercing elements are, moreover, supported on the brew chamber top and can be moved, sloping from above, into it. Based on this arrangement, the piercing elements can, on one hand, reliably pierce into the coffee pouch and, on the other hand, safely hold or carry it when pushed into the coffee pouch.

Suitably, the piercing elements are disposed or supported, so that the tips, or ends, thereof can be pushed from a pushed-back position near the virtual central vertical axis into a position more distant from this axis in the interior of the brew chamber top. In this way, the tips, or ends are pushed outward towards and into the edge of the coffee pouch which is disposed in the brew chamber top. In this state, the coffee pouch is reliably secured against slipping out of the piercing element system.

According to the features of the present invention, the brew chamber top is so shaped that the tips, or ends, of the piercing elements are disposed in a ceiling section of the brew chamber top when the piercing elements are withdrawn, and that they can be pushed from this ceiling section into the interior of the brew chamber top in order to exert their holding function of the coffee pouch. Based on such a design of the brew chamber top, the tips, or ends, of the piercing elements will not disturbingly project into the interior of the brew chamber top, for example when cleaning the opened brew chamber.

A compact and reliable operation mechanism of the piercing elements shaped of needles consists in that the brew chamber top comprises a coulisse arrangement of an outer needle coulisse and an inner needle coulisse, which coulisse arrangement is connectable with the locking mechanism of the brew chamber, wherein the outer needle coulisse is solidly connected to the brew chamber top, and in the outer needle coulisse, an inner needle coulisse is vertically movably guided and coupled to it by needle carrier arm units. Each needle carrier arm unit comprises an outer needle carrier arm movable in the outer needle coulisse and an inner needle carrier arm movable in the inner needle carrier coulisse. The outer needle carrier arm and the inner needle carrier arm are solidly connected to each other at one of their ends each. The needle carrier arm of the needle carrier arm unit having the free downwardly sloping end carries, at this end, the needle which can be moved within a sealed channel formed in the ceiling section of the brew chamber top. The channel is disposed in the ceiling section so that it is directed into the interior of the brew chamber top and, after putting the brew chamber top onto the brew chamber base, into the interior of the closed brew chamber.

This compact operation mechanism of the needles is supplemented, in that between the outer needle coulisse and the inner needle coulisse a restoring spring is provided which moves the inner needle coulisse into an elevated position in which the needles are retracted from the interior of the brew chamber top. Thereby, it is also safeguarded that the needle tips do not project into the interior of the brew chamber top when no external force acts onto the actuation mechanism.

In order to connect the inner needle coulisse with the locking mechanism of the brew chamber disposed outside of the coulisse arrangement, a preferably dome-shaped actuation element is provided on the inner needle coulisse. An element of the locking mechanism of the brew chamber may engage on the dome shaped actuation element to press onto the dome shaped actuation element and thus push the needle tips into the interior of the brew chamber top.

For ease of production, brew chamber top and outer needle coulisse may be made as one piece.

In one embodiment according to the present invention, one outer needle carrier arm each of the needle carrier arm units, starting from a connecting spot with the inner needle carrier arm, is downwardly bent and carries the needle at its free lower end. The needle is, therefore, reliably moved by moving the outer needle carrier arm and the inner needle carrier arm connected therewith. Furthermore, the needle extends, suitably coaxially, from the free lower end of the outer needle carrier arm.

According to the features of the present invention, the coffee machine comprises a chassis in which the brew chamber top is guided substantially vertically and the carrier of the brew chamber base is substantially movable in horizontal direction. In this connection, the locking mechanism of the brew chamber comprises at least one rocking lever which is suited for manual operation and to this end is pivotally supported on the chassis and includes, spaced from the support, a gliding bolt which is guided in a lowering and elevating groove connected with the brew chamber top. As a component of the actuation mechanism of the piercing elements, a spring-loaded lowering lever is pivotally supported on the brew chamber top, which rests glidingly on the dome-shaped actuation element at the inner needle coulisse and is carried along by a carrier bolt on the rocking lever when the rocking lever is further pivoted beyond the lowest position of the gliding bolt and thus the lowest position of the brew chamber top in a range wherein the gliding bolt is in a locking section of the lowering and elevating groove while the brew chamber top remains in a closed position of the brew chamber and the piercing elements are moved into the interior of the brew chamber top by lowering the lowering lever. In the moving path of the lowering lever, a blocking lever is so arranged that the lowering lever is blocked at a lowering position in order to maintain the needles in the position moved into the brew chamber top until the blocking lever is released by a blocking release on the carrier by drawing the carrier out. By releasing the blocking lever, the restoring spring between the outer needle coulisse and the inner needle coulisse becomes effective which moves the inner needle coulisse into an elevated position in which the needles are retracted from the interior of the brew chamber top. This embodiment of the locking mechanism of the brew chamber and the actuation mechanism of the piercing elements connected therewith enables a reliable coupling of these mechanisms and thus the movement processes of the brew chamber top, of the carrier with the brew chamber base and the needles as the piercing elements. Other embodiments for actuating the piercing elements coupled with the brew chamber top and the carrier of the brew chamber base are possible as well.

In another embodiment, the rocking lever of the locking mechanism can be locked at a lever end position at which the brew chamber top is lowered onto the brew chamber base and the brew chamber is thus locked. For such locking, no external holding forces are required.

To this end, the rocking lever of the locking mechanism can suitably be provided with two arms, i.e. with a first lever arm and a second lever arm, wherein the first lever arm can in particular be manually operated and includes the carrier bolt and the second lever arm is provided with the gliding bolt and, spaced from it, with a locking hook which can be locked by means of a locking bolt on the chassis. This embodiment is structurally uncomplicated.

For an even two-sided load of the chassis and distortion-free support, the chassis is shaped, approximately U-shaped having to side walls, or chassis flanks, respectively, where in both side walls one rocking lever each is supported and both rocking levers are connected by the carrier bolt which is designed as a bridge. The lowering lever is disposed, in this arrangement, between the two rocking levers in a movement path of the carrier bolt and can, therefore, reliably be pressed down by it when the carrier bolt has come into contact with the lowering lever.

The unit of the two rocking levers and of the carrier bolt connecting them can additionally be reinforced in that the two rocking levers are supplementarily connected with one another by an actuation bridge provided on the end sides each on the first lever arm of each of the two rocking levers. The actuation bridge is particularly suited for comfortable manual operation.

Figure 2:
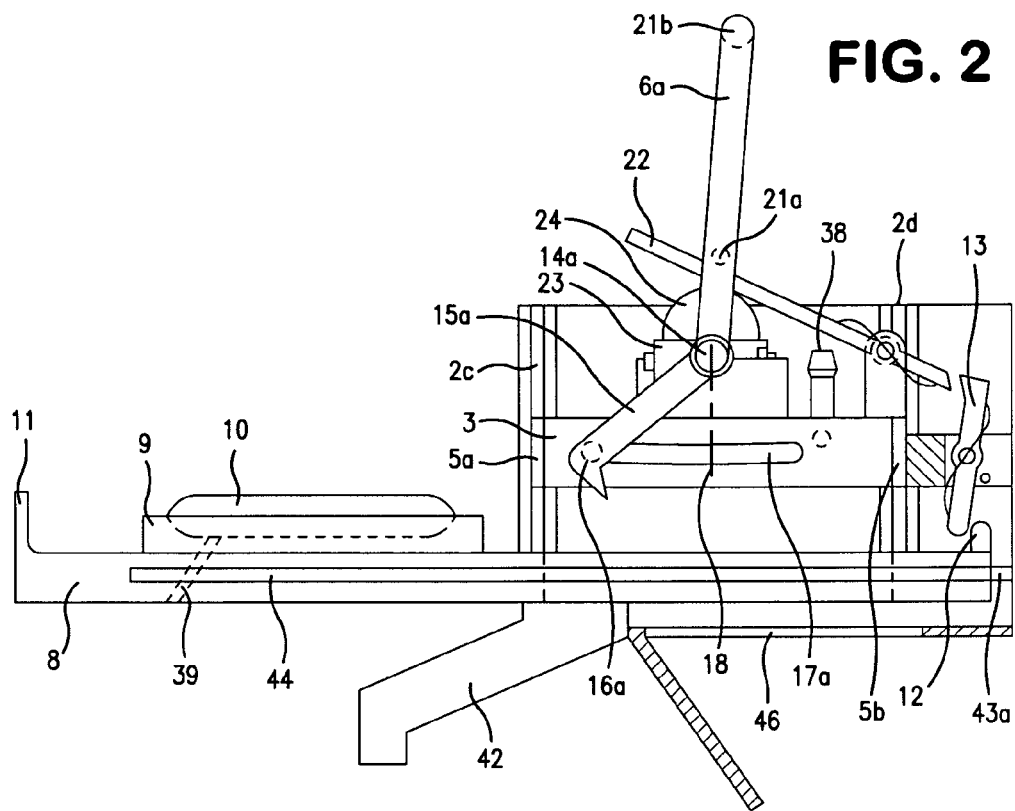
Figure 3:
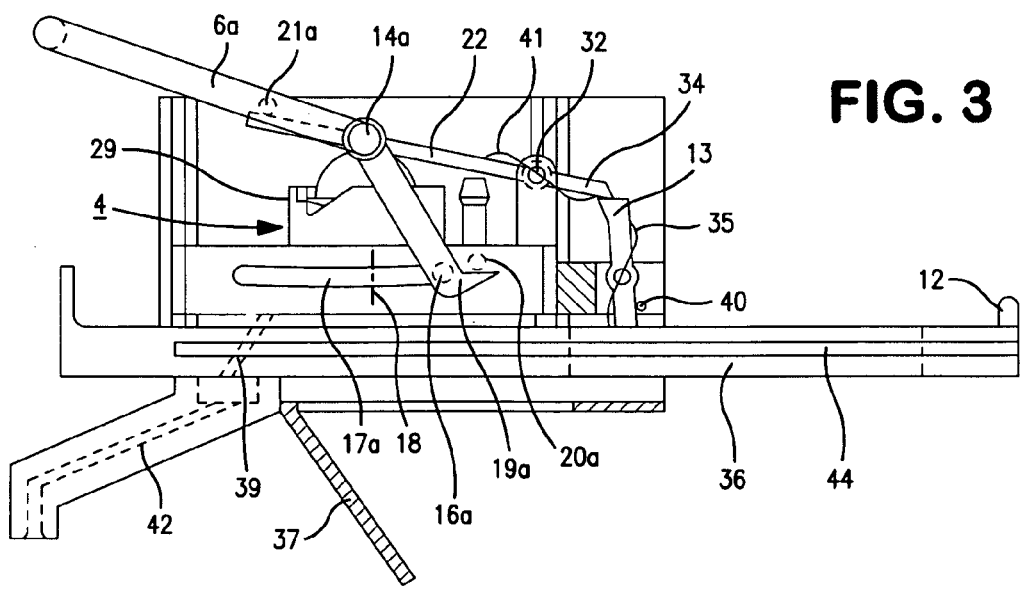
Figure 4:
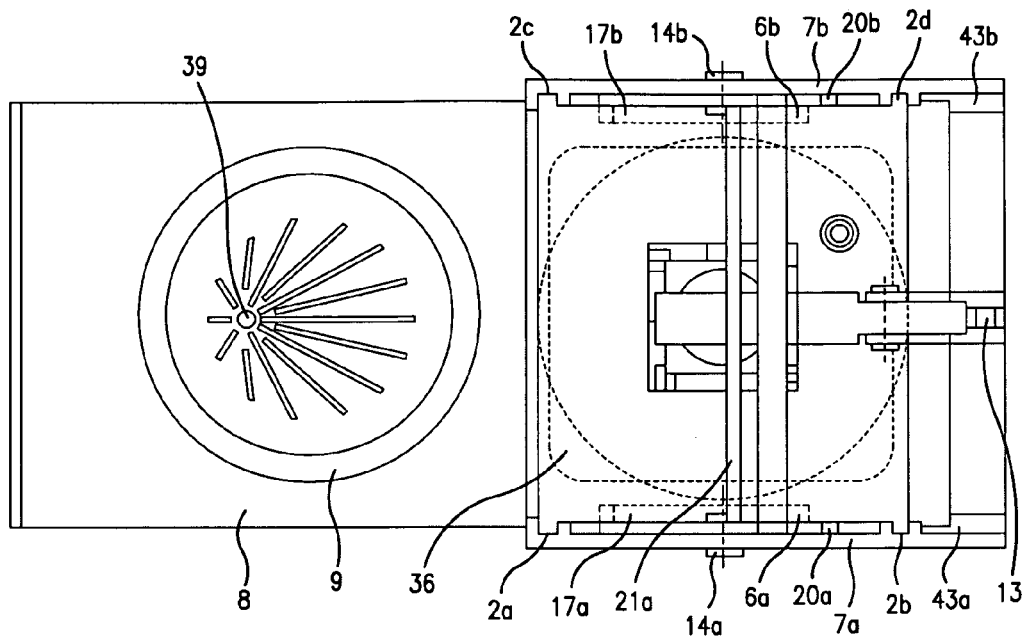
Figure 5:
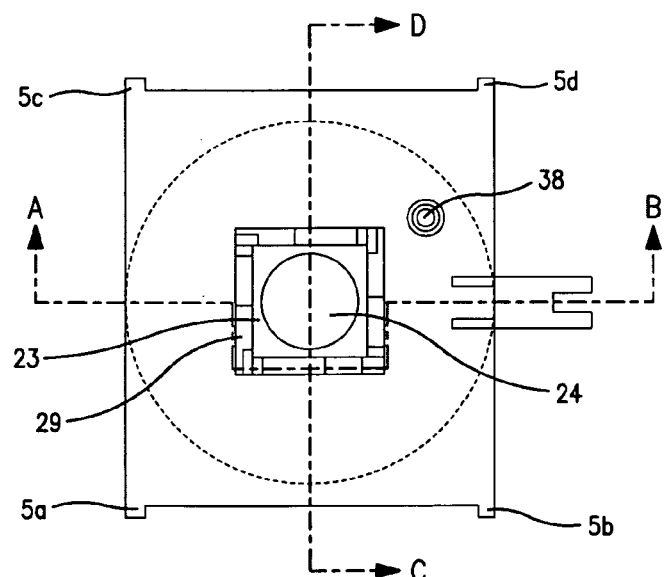
Figure 6:
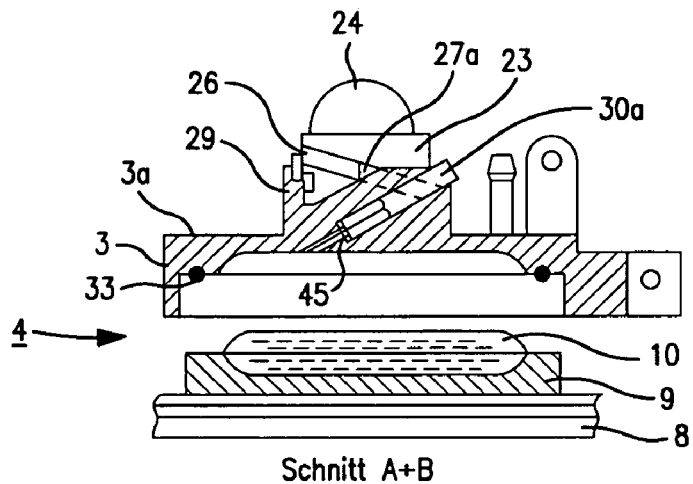
Figure 7:
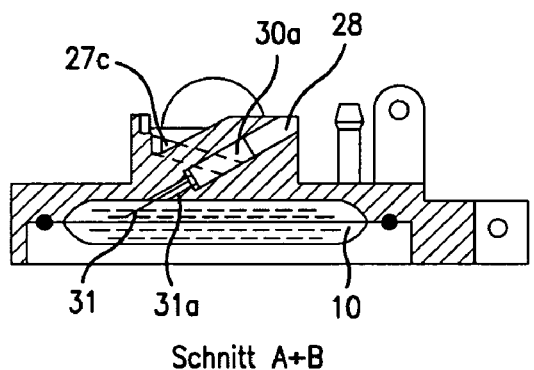
Figure 8:
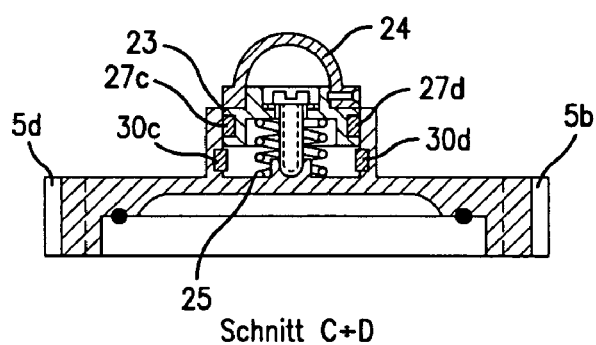
Figure 9:
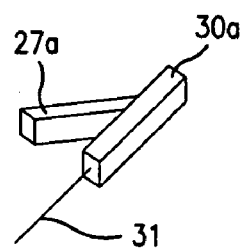
Figure 10:
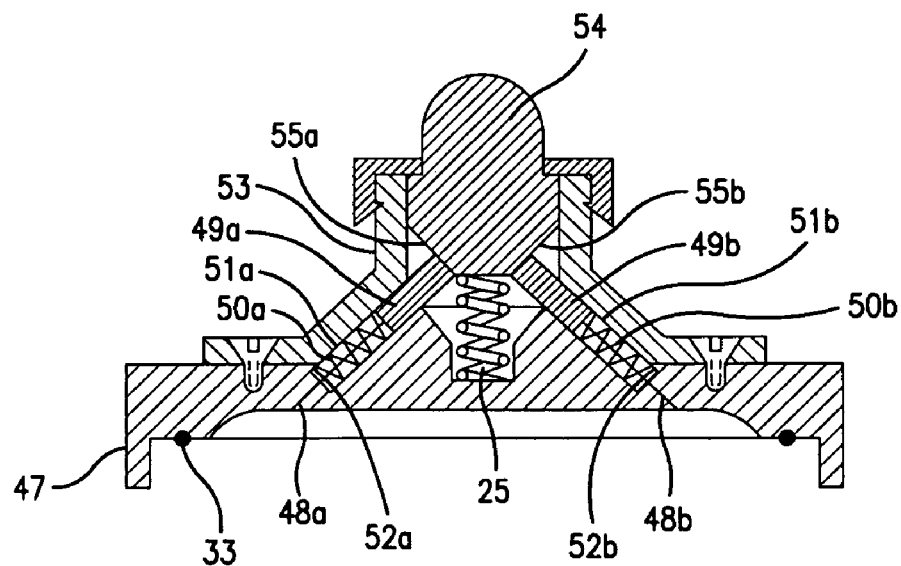
Figure 11:
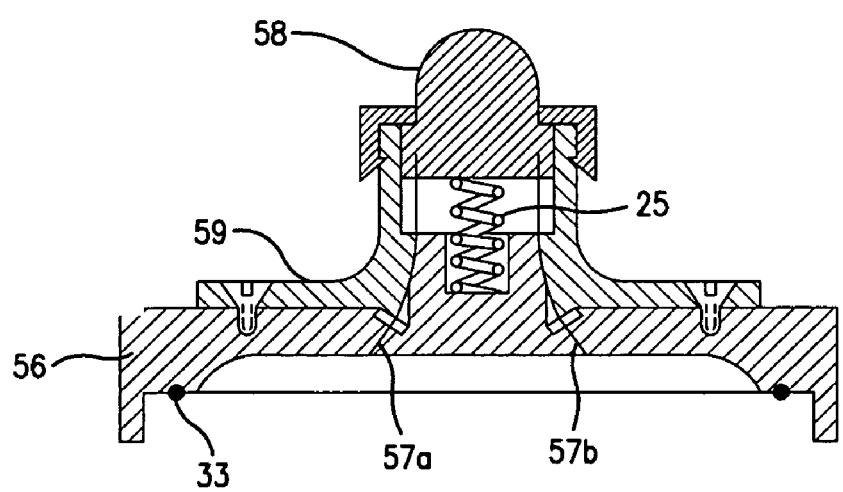

Exemplified embodiments of the present invention will be described in the following based on a drawing comprising eleven figures from which advantageous details of the invention will become apparent in more detail and wherein FIG. 1 is a brew unit module in which a first embodiment as basic form of the invention is incorporated, FIG. 2 is a lateral view of the brew unit module according to FIG. 1 without a cut-away front chassis side flank, with a drawn-out horizontally movable carrier, also referred to as a drawer, with a deposited coffee pouch and opened brew chamber, partly in section, FIG. 3 is a lateral view of the brew unit module according to FIG. 2, however, with pushed-in carrier, with a closed brew chamber and an inner needle coulisse locked in a lower position, partly in section, FIG. 4 is a top view on the brew unit module with drawn-out carrier and rocking levers in the upper starting position, FIG. 5 is a top view on a brew chamber top, FIG. 6 is a drawn-out section according to intersection line A-B of FIG. 5 through the opened brew unit together with a partial section of the pushed-in carrier and deposited coffee pouch, FIG. 7 is the section through the brew chamber top according to FIG. 6, however with opened brew chamber with lowered inner needle coulisse and with the coffee pouch held by needles, FIG. 8 is a central section corresponding to intersection line C-D according to FIG. 5 through the brew chamber top, FIG. 9 is a needle carrier including needles as a perspective in an enlarged illustration as part of the first embodiment, FIG. 10 is a central section through a second embodiment of the brew chamber top with movable needle carriers, and FIG. 11 is a central section through a third embodiment of a brew chamber top with flexible wires as piercing elements.

In FIG. 1, a brew unit module is diagrammatically shown including a brew chamber top 3 of the first embodiment in a U-shaped chassis 1 vertically movable in guide grooves 2a, 2b, 2c, 2d, whereby, first of all, an outer needle coulisse 29 integrally shaped with it can be seen whereas a section defining the brew chamber is not visible. A vertical lowering and elevating movement of the brew chamber top can be obtained by means of rocking levers 6a, 6b, pivotally supported in two chassis side flanks 7a, 7b and connected by means of a carrier bolt 21a and an actuation bridge 21b provided at the end to constitute a reinforced unit. Rocking levers 6a, 6b can manually be pivoted by engaging at actuation bridge 21b of the present embodiment from an approximately perpendicular position, compare also FIG. 2, into an approximately horizontal position, compare also FIG. 3.

Brew unit 4 includes furthermore a horizontally movable carrier 8 which can also be referred to as drawer and for the guiding of which guide grooves 44 are provided in the longitudinal sides of the carrier which can be moved by means of chassis guide ridges 43 one chassis guide ridge 43a of which can be seen in FIGS. 1 and 2. The carrier carries a brew chamber base 9. Spaced from brew chamber base 9, it has a pouch opening 36 which is hidden in FIG. 1 by brew chamber top 3 but is shown in FIG. 4 by a broken line. FIG. 4 shows carrier 8 in the same position drawn out from brew unit 4 as does FIG. 1.

For feeding the carrier with a fresh coffee pouch, the carrier can that far be drawn out by means of a drawer handle 11 from the brew unit opened as in accordance with FIGS. 1 and 2 until the path of the carrier is stopped by a blocking release 12 contacting a blocking lever 13, compare FIG. 2. In the open state of the brew unit, brew chamber top 3 is elevated into its upper position, as shown in FIG. 2, so that when subsequently pushing carrier 8 into brew unit 4, coffee pouch 10 on carrier 8 will not push against the brew chamber top and not when after the brewing process the carrier carrying the leached-out, i.e. used, coffee pouch is drawn out again from the brew unit. To begin with, however, the coffee pouch which, as shown in FIG. 2, has been placed into brew chamber base 9 is pushed by means of carrier 8 into chassis 1 until butting against the stop. Brew chamber base 9 is now centrically underneath brew chamber top 3.

Subsequently, brew unit 4 is locked by means of rocking levers 6a, 6b by pivoting them about their points of support 14a, 14b which are supported in chassis sides 7a, 7b, anti-clockwise, forwardly downwardly, into a position as can be taken from FIG. 3. The two-arm rocking levers 6a, 6b include, on one side of the points of support, lower arms 15a, 15b from which gliding bolts 16a, 16b are formed which engage in lowering and elevating grooves 17a, 17b provided on both brew chamber top sides of brew chamber top 3. By the pivoting movement of rocking levers 6a, 6b, anticlockwise, in FIGS. 2 and 3, brew chamber top 3 is, in parallel, moved downward so that brew chamber top 3 comes into tight contact with brew chamber base 9 moved directly underneath it, thus forming a brew chamber. This state is reached when gliding bolts 16a, 16b in lowering and elevating grooves 17a, 17b are positioned vertically directly underneath rocking lever points of support 14a, 14b, which can be considered as the lower dead-center position 18 of rocking levers 6a, 6b which, however, for actuating needles 31a, 31b, 31c, 31d as the piercing elements are further pivoted, clock wisely, beyond the lower dead center while gliding bolts 16a, 16b glide in upwardly bent end sections so that brew chamber top 3 retains its position on brew chamber base 9. In this position, locking is effected by means of locking hooks 19a, 19b on the free ends of lower rocking lever arms 15a, 15b at locking bolts 20a, 20b provided on the sides facing each other in the interior on chassis side flanks 7a, 7b. In this way, the brew chamber top is additionally locked against the brew pressure in the brew chamber during the course of the subsequent brewing process.

Prior to this brewing process, however, needles are pushed, by the clockwise pivoting movement of rocking levers 6a, 6b beyond the lower dead center 18, into the interior of brew chamber top 3, one of which needles can be seen in FIG. 7.

The brew chamber formed by putting brew chamber top 3 on brew chamber base 9 is sealed towards the outside by means of a sealing ring 33, compare FIG. 6, against the brew pressure in the brew chamber. The sealing ring may, however, also be provided on an inner brew chamber flank.

Actuation of the needles by carrier bolt 21a on rocking levers 6a, 6b is effected by means of a lowering lever 22 when carrier bolt 21a which connects rocking levers 6a, 6b with one another presses on the lowering lever during the course of the above-mentioned pivoting movement. Since during the downward movement of brew chamber top 3, lowering lever 22 supported on it and pivotal about a point of rotation moves faster downward than carrier bolt 21a can follow, carrier bolt 21a will reach lowering lever 22 only when gliding bolts 16a, 16b of rocking levers 6a, 6b are already at the lower dead center. This means that inner needle coulisse 23 on top of which a dome-shaped actuation element 24 is provided, will not be lowered in outer needle coulisse 22 by lowering lever 22 before gliding bolts 16a, 16b have reached, and exceeded, lower dead center 18. Actuation of the needles is, therefore, effected in relation to the locking of the brew chamber by lowering brew chamber top 3 in the kind of a sequential control. Thereby, it is safeguarded that needles 31 will not pierce into the coffee pouch before the brew chamber in brew unit 4 is locked so that, even in the most unfavorable case, the coffee pouch cannot laterally slip away thus impairing, in the most unfavorable case, the tight lock of the brew chamber.

Actuation of the needles in order to push them into the interior of brew chamber top 3 and thus into the locked brew chamber is obtained by the structure of the inner, approximately cube-shaped, needle coulisse 23 having bent inner guide grooves provided on the outer sides thereof, one of which grooves is referred to as 26 in FIG. 6, and by the outer needle coulisse 29 receiving the inner needle coulisse, on the inside of the walls of which outer needle coulisse four so-called outer guide grooves bent opposite to the inner guide grooves are provided, one outer guide groove 28 of which is depicted in FIG. 7.

A needle carrier arm unit slip-movably supported in one outer needle coulisse and one inner needle coulisse each is shown in FIG. 9. The needle carrier arm unit comprises an outer needle carrier arm 30a solidly connected at one end with an inner needle carrier arm 27a disposed next to it, in a way so that inner needle carrier arm 27a seen from the connecting spot not designated is bent upwardly and outer needle carrier arm 30a is bent downwardly. At the lower free end of outer needle carrier arm 30a, needle 31 projects as an extension of the outer needle carrier arm. Such needle carrier arm units are slip-movingly disposed on all four outer sides of inner needle coulisse 23, and all inner sides of outer needle coulisse 29, respectively, in a respective inner guide groove and outer guide groove. That is why from the drawn-out section A-B in FIG. 6 and from FIG. 7 the needle carrier arm unit together with inner needle carrier arm 27a and outer needle carrier arm 30a can be seen, and from section C-D according to FIG. 8, the needle carrier arm units consisting of inner needle carrier arm 27c and outer needle carrier arm 30c and inner needle carrier arm 27d and outer needle carrier arm 30d, respectively, can be taken.

From FIG. 8, furthermore, the arrangement of compression spring 25 provided as restoring spring can be taken which tries to push dome-shaped actuation element 24 upwardly into the high position thereof.

By a downward movement of inner needle coulisse 23 caused by lowering lever 22 against restoring spring 25, inner needle carrier arms 27a, b, c, d disposed in slanting-upwardly directed inner guide grooves 26 of inner needle coulisse 23 are pushed slanting-upwardly and, at the same time, outer needle carrier arms 30a, b, c, d disposed in the slanting-downwardly disposed outer guide grooves 28a,b, c, d of outer needle coulisse 29 solidly connected therewith and thus needles 31 disposed at the lower ends thereof are pushed slanting-downwardly whereby needles 31, outside the brewing space when not spring-loaded, are pushed into the brewing space and pierce into coffee pouch 10.

During the course of the so-called over-lift of rocking levers 6a, 6b, i.e. when they are pivoted beyond the dead center 18 thereof with their gliding bolts 16a, 16b into the end sections of lowering and elevating grooves 17a, 17b, and lowering lever 22 is correspondingly pressed down, the rear end 34 thereof passes from the resting position thereof, see FIG. 2, into a blocking position, see FIG. 3, wherein the rear end 34 thereof can retreat, via a head, not designated, of blocking lever 13 which contrary to the force of blocking lever spring 35, in clockwise direction when it takes a position on the carrier distant from blocking release 12, particularly according to FIG. 3.

Needles 31 pushed into coffee pouch 10 in brew chamber top 3 will correspondingly hold the coffee pouch fast in brew chamber top as long as the blocking lever retains its resting position determined by a path limiter 40.

For the subsequent brewing process, brewing water is fed via inlet 38 disposed on brew chamber top 3 to brew unit 4, and the brewed coffee passes via a drain passage 39 in carrier 8 in the pushed-in position thereof and via outlet 42, at the bottom of chassis 1, into a collecting vessel not shown.

When the brewing process has been finished, the rocking levers can clock wisely be returned into the resting position thereof. This causes the brew chamber top to move upwards. Because lowering lever 22 is arrested by blocking lever 13 on brew chamber top 3, the inner needle coulisse 23 continues to remain in the compressed position thereof and that is why needles 31 remain, for the time being, in the leached-out, i.e. used, coffee pouch 10 while the latter, together with brew chamber top 3 moves upwards and remains there as long as blocking release 12 remains clear of blocking lever 13 and thus the rear end 34 of lowering lever 22 rests on the head of the blocking lever.

In order to dispose used coffee pouch 10 and charge brew chamber base 9 on carrier 8 anew, the carrier has to be drawn out of the chassis up to a stop, as shown in FIG. 2, which can be effected manually, supported by spring force, or by motor. Shortly before reaching the maximum draw-out path, blocking release 12, in FIGS. 2 and 3 at the right end of the carrier, arrives at a lower end of blocking lever 13 releasing the blocking thereof in that the blocking release pivots blocking lever 13 in clockwise direction. In that way, the rear end 34 of lowering lever 22 is released. It can now follow an upward movement of the dome-shaped actuation element on which it rests. Thereby, the inner needle carrier arms 27a, 27b, 27c, 27d will glide in their inner guide grooves 26 downward and the outer needle carrier arms 30a, 30b, 30c, 30d will glide in their outer guide grooves 28 upward so that needles 31 are drawn out from the used coffee pouch and the coffee pouch will drop downward. It will fall through carrier opening 36 disposed directly underneath brew chamber top 3 and in a central position relative thereto, and subsequently through a chassis opening 46 under carrier opening 36 onto a disposal slope 37.

After releasing the needles, the used pouch thus drops from brew chamber top 3 when the latter is in the position shown in FIG. 2 in which, moreover, brew chamber base 9 can be charged with a fresh coffee pouch 10 which, contrary to the used coffee pouch dropping from brew unit 4, is shown in FIG. 2.

In a first variant of the brew chamber top according to FIG. 10 in which the brew chamber top is designated by reference numeral 47, it is also needles which are used as piercing element, of which two needles 48a, 48b can be seen in FIG. 10. At right angles relative to the sectional plane shown in FIG. 10, two further needles can be disposed in a similar way. The needles each project from a needle carrier arm 49a, 49b at the lower end, substantially slanting outwardly. The needle carrier arms are maintained in the resting position shown in FIG. 10 by springs 50a, 50b. Guide grooves of the needle carrier arms are designated by reference numerals 51a, 51b. At their lower ends, they are sealed by seals 52a, 52b on which spring 50a, 50b can support themselves. Needle carrier arms 49a, 49b and springs 50a, 50b are maintained in guide grooves 51a, 51b by a cap 53 to be screwed onto brew chamber top 4, in an upper neck portion of which cap a dome-shaped actuation element 54 is movably supported. Dome-shaped actuation element 54 can equally be pressed down in order to push needles 48a, 48b into the interior of brew chamber top 47, or permit by the action of a central restoring spring 25 in combination with springs 52a, 52b a pushing back of the needles into brew chamber top 47 as in the case of the first embodiment with the dome-shaped actuation element 24. When actuating dome-shaped actuation element 54, however, upper front faces of needle carrier arms 49a, 49b can glide along plane surfaces 55a, 55b which are beveled at the lower end of dome-shaped actuation element 54.

A second variant of brew chamber top 56 according to FIG. 11 differs from the first variant according to FIG. 10 and from the basic shape according to FIGS. 1 through 9 substantially in that as re-pushable piercing elements, elastic wires are provided which are sufficiently stiff to be thrust into a coffee pouch and which are designated by reference numerals 57a, 57b. The disposal of the wires can basically be selected identically to the one of needles 48a, 48b, etc. in FIG. 10. Upper ends of wires 57a, 57b are solidly embedded in dome-shaped actuation element 58. Under it, they are bent and guided slanting-outwardly, and to this end are kept slip-movably in their guides, not shown, by a cap 59. Actuation of dome-shaped actuation element 58 is again effected, as in the basic version according to FIGS. 1 through 9, contrary to the force of central restoring spring 25. The lower wire ends, or tips, are consequently pushed into the interior of the brew chamber top when the dome-shaped actuation element is pressed down, and when it is free, are retracted into brew chamber top 56.

The invention claimed is:

1. Coffee machine for making a coffee beverage by means of pre-packed and pre-portioned coffee pouches (10) comprising
a brew chamber which includes a brew chamber top (3, 47, 56) and a brew chamber base (9), said brew chamber top (3, 47, 56) being movable by means of a locking mechanism along a virtual substantially vertical axis from an elevated position to a position lowered on the brew chamber base (9) to form a tight brew chamber and being movable back into the elevated position where a carrier (8) of brew chamber base (9) can be pushed, in an essentially horizontal plane from a pushed-in position in which said brew chamber base (9) and said brew chamber top (3, 47, 56) are disposed coaxially relative to each other, into a drawn-out position in which a pouch (10) can be placed on said brew chamber base, and vice versa between these positions
wherein:
piercing elements are pressure-tightly supported at said brew chamber top (3, 47, 56) in a manner that they can be pushed sloping from above of said brew chamber top (3, 47, 56) into the interior of said brew chamber top (3, 47, 56) for releasably holding said pouch (10) in said brew chamber top (3, 47, 56) and pushed out therefrom,
said brew chamber top (3) comprises a coulisse arrangement of an outer needle coulisse (29) and an inner needle coulisse (23), which coulisse arrangement is connectable with the locking mechanism,
said outer needle coulisse (29) is solidly connected with said brew chamber top (3),
in said outer needle coulisse (29) said inner needle coulisse is vertically movably guided and is connected to said outer needle coulisse by needle carrier aim units,
each needle carrier arm unit each comprises an outer needle carrier arm (30a, 30b, 30c, 30d) movable in said outer needle coulisse and an inner needle carrier arm (27a, 27b, 27c, 27d) movable in said inner needle carrier coulisse, which are staggered next to each other, are inversely vertically sloped relative to each other and are solidly connected to each other at one of their ends each, and
an actuation mechanism of said piercing elements for actuating said piercing elements relative to said brew chamber top (3, 47, 56) is coupled to the locking mechanism of said brew chamber so that after lowering said brew chamber top and thus locking the brew chamber, said actuation mechanism pushes said piercing elements into the interior of brew chamber top (3, 47, 56), and after elevating said brew chamber top and thus opening said brew chamber and after drawing out said horizontally movable carrier (8) into the drawn-out position, withdraws said piercing elements from the interior of said brew chamber top (3, 47, 56).

2. Coffee machine according to claim 1,
wherein:
in said horizontally movable carrier (8) a pouch opening (36) is so disposed that said pouch opening is substantially centrically disposed underneath said brew chamber top (3, 47, 56) when said carrier (8) has been moved into the pushed-in position.

3. Coffee machine according to claim 1, wherein: said piercing elements are needles (31; 48a, 48b).

4. Coffee machine according to claim 1, wherein: said piercing elements are wires (57a, 57b) having wire ends which can be pushed into the interior of said brew chamber top.

5. Coffee machine according to claim 1, wherein: a plurality of piercing elements of a piercing element system are staggered relative to each other in equal arc sections about a virtual central vertical axis.

6. Coffee machine according to claim 5, wherein: at least two piercing elements are disposed preferably at equal angular distances about the virtual central vertical axis of said piercing element system.

7. Coffee machine according to claim 1, wherein: said needles (31) are tangentially aligned at a virtual circle about the virtual vertical axis of a piercing element system.

8. Coffee machine according to claim 1, wherein: said piercing elements are supported on said brew chamber top (3, 47, 56) and can be pushed sloping from above into the interior thereof.

9. Coffee machine according to claim 1,
wherein:
said piercing elements are supported so that the tips, or ends, thereof can be pushed from a pushed-back position near the virtual central vertical axis into a position more distant from this axis in which said tips, or ends, are moved into the interior of said brew chamber top (3, 47, 56).

10. Coffee machine according to claim 1, wherein: the tips, or ends, of said piercing elements are pushed-back in a ceiling section (3) of said brew chamber top (3) and can be moved therefrom into the interior of said brew chamber top.

11. Coffee machine according to claim 1,
wherein:
said brew chamber top (3) comprises a coulisse arrangement of an outer needle coulisse (29) and an inner needle coulisse (23), which coulisse arrangement is connectable with the locking mechanism,
said outer needle coulisse (29) is solidly connected with said brew chamber top (3),
in said outer needle coulisse (29) said inner needle coulisse is vertically movably guided and is connected to said outer needle coulisse by needle carrier arm units,
each needle carrier arm unit each comprises an outer needle carrier arm (30a, 30b, 30c, 30d) movable in said outer needle coulisse and an inner needle carrier aim (27a, 27b, 27c, 27d) movable in said inner needle carrier coulisse, which are staggered next to each other, are inversely vertically sloped relative to each other and are solidly connected to each other at one of their ends each,
a free downwardly sloping end of one of said needle carrier arms (30a, 30b, 30c, 30d) of each of said needle carrier unit carries the needle (31) and
said needle (31) can be moved within a sealed needle channel (31a) formed in the ceiling section (3a) of said brew chamber top (3), said needle channel (31a) being directed into the interior of said brew chamber top (3).

12. Coffee machine according to claim 11, wherein: between said outer needle coulisse (29) and said inner needle coulisse (23) a restoring spring (25) is provided which moves said inner needle coulisse (23) into an elevated position in which the needles (31) are retracted from the interior of said brew chamber top (3).

13. Coffee machine according to claim 11,
wherein:
on said inner needle coulisse (23) an actuation element (24) is provided.

14. Coffee machine according to claim 11, wherein: said brew chamber top (3) and said outer needle coulisse (29) are made as one piece.

15. Coffee machine according to claim 11,
wherein:
the outer needle carrier arm (30a, 30b, 30c, 30d) each of one of said needle carrier arm units, starting from a connecting spot with said inner needle carrier arm (27a, 27b, 27c, 27d) is downwardly bent carrying at its free lower end the needle (31).

16. Coffee machine according to claim 15, wherein: said needle (31) extends coaxially from the free lower end of said outer needle carrier arm (30a, 30b, 30c, 30d).

17. Coffee machine according to claim 13,
wherein:
said brew chamber top (3) is guided vertically in a chassis (1) and said carrier (8) of said brew chamber base (9) is movable in horizontal direction,
the locking mechanism of the brew chamber comprises at least one rocking lever (6a, 6b) which is pivotally supported on said chassis (1) and includes, spaced from the support, a gliding bolt (16a, 16b) which is guided in a lowering and elevating groove (17a, 17b) connected with said brew chamber top (3),
on said brew chamber top (3) a spring-loaded lowering lever (22) is pivotally supported which rests glidingly on said dome-shaped actuation element (24) at said inner needle coulisse (23) and can be carried along by a carrier bolt (21a) on the rocking lever (6a, 6b) when said rocking lever (6a, 6b) is further pivoted beyond a lowest position of gliding bolt (16a, 16b) and thus of said brew chamber top (3) in a range wherein said gliding bolt (16a, 16b) is in a locking section of said lowering and elevating groove, said brew chamber top (3) remains in its lowered position and said piercing elements are moved into the interior of said brew chamber top (3) by lowering said lowering lever (22),
a blocking lever (13) is so disposed in a movement path of said lowering lever (22) that said lowering lever (22) can be blocked by it at a lowering position and that said blocking lever (13) can be released by blocking release (12) on the carrier (8) by drawing the carrier out.

18. Coffee machine according to claim 17, wherein: said rocking lever (6a, 6b) of said locking mechanism can be blocked at a lever end position at which said brew chamber is locked.

19. Coffee machine according to claim 17,
wherein:
said rocking lever (6a, 6b) of said locking mechanism is provided with a first lever arm and a second lever arm (15a, 15b),
said first lever arm can in particular be manually operated and includes said carrier bolt (21a) and
said second lever arm (15a, 15b) is provided with said gliding bolt (16a, 16b) and at a distance thereto, with a locking hook (19a, 19b) which can be locked by means of a locking bolt (20a, 20b) on chassis (1).

20. Coffee machine according to claim 17,
wherein:
said chassis (1) is U-shaped having two chassis side flanks (7a, 7b), in said two chassis side flanks (7*a*, 7*b*) one of said rocking levers (6*a*, 6*b*) each is supported, the said two rocking levers (6*a*, 6*b*) are connected by said carrier bolt (21*a*) which is designed as a bridge, and said lowering lever (22) is disposed between said two rocking levers (6*a*, 6*b*) in a movement path of said carrier bolt (21*a*).

21. Coffee machine according to claim 20, wherein: the said two rocking levers (6*a*, 6*b*) are furthermore connected with one another by an actuation bridge (21*b*) provided on the end sides each of said first lever arm.

22. Coffee machine according to claim 13, wherein: the actuation element (24) is dome-shaped.

* * * * *